Feb. 21, 1967  S. D. TEACHOUT  3,305,638
CONDENSER MICROPHONE CIRCUIT WITH SOLID ELECTROLYTE
BATTERY POLARIZING SOURCE
Filed Feb. 17, 1964

INVENTOR.
Steven D Teachout
BY
Julian Caplan
attorney

United States Patent Office 3,305,638
Patented Feb. 21, 1967

3,305,638
CONDENSER MICROPHONE CIRCUIT WITH SOLID ELECTROLYTE BATTERY POLARIZING SOURCE
Steven D. Teachout, 3447 S. El Camino Real, San Mateo, Calif. 94403
Filed Feb. 17, 1964, Ser. No. 345,136
5 Claims. (Cl. 179—1)

This invention relates to a new and improved condenser microphone circuit having numerous advantages over pre-existing condenser microphone preamplifier circuits.

A principal objection to prior condenser microphones is that they have required an external power supply. The present invention does not require an external power supply in that the microphone, amplifier, batteries and transformer are all arranged in compact shape so that they fit in the handle of the microphone itself. This arrangement improves the convenience of the microphone in that it eliminates the necessity of plugging equipment into an A.C. power supply or using rechargeable batteries with a D.C. voltage converter. Further, the prior devices are vulnerable to failure of parts, which vulnerability is reduced by the present invention. Additionally, such prior devices have inherent ripple and also tend to degrade the signal-to-noise ratio.

Still another feature of this invention is that prior microphones of the condenser type require a linking cable with five or more conductors, whereas the present invention uses a standard three-wire cable and does not require an adapter to hook into other connecting cables and further is considerably more flexible.

Still another feature and advantage of the invention is the size of the finished microphone, which is such that it can conveniently be held in the hand with all of the aforementioned parts incorporated therein.

A still further feature of the invention is the fact that it is transistorized and does not require amplifier tubes. This reduces noise, hum, and microphonics and also indefinitely prolongs the life of the equipment.

Another feature of the present invention is the fact that the microphone will operate for 1,000 hours with either changeable or rechargeable batteries. The closest competitive microphone of this general type will operate only about 50 hours.

A still further feature of the invention is that the polarizing battery used in connection with the condenser has a life expectancy of 20 years or more, far beyond the normal life of the microphone.

Other advantages of the invention reside in constructional features as follows: The circuit is encapsulated in a single unit with the condenser and its amplifying elements, which unit is compact and rugged. Preferably the amplifier, polarizing battery and transformer are encapsulated into one unit and a 12-volt battery in a second unit. These two units fit together end-to-end with simple connections, and the two units fit inside the casing of the microphone.

A further feature of the foregoing construction is the fact that the principal battery is accessible for recharging through the output cable connector to the microphone.

A further feature of the invention is that the principal battery can be recharged through a conventional three-wire system without the necessity of extra leads as is required in conventional condenser microphone systems.

A still further feature of the circuit is that the principal battery may be discarded entirely and a remote power supply used, as in conventional condenser microphone systems, but still through a conventional three-wire cable and connector.

A further feature of the invention is that the principal battery may be recharged from an external source at the same time as the microphone is in use and the circuit is functioning as an amplifier.

Still another advantage of the foregoing arrangement is the fact that it is extremely rugged except for the transducer itself, which is inherently somewhat sensitive. No tubes are used in the present device, thereby eliminating a potential source of damage.

Still another feature of the invention is the incorporation in the circuit of low-cut switches which, when used to switch a filter circuit, cut off low frequencies as desired and hence cut out the blast sometimes associated with shock, wind noise and vocal sounds close to the microphone.

Another advantage of the circuit is the utilization of magnetic reed switches as low frequency cut-off switches. Magnetic reed switches have extremely high open circuit resistance, can be sealed within the amplifier module, and are fool-proof, simple and have a long operating life.

A principal feature of the invention is the fact that it employs a field effect transistor which has an inherently high input impedance and a low noise figure. It is well-known that maximum power transfer requires a matching of source impedance to load impedance. Heretofore, it has not been practical to match the very high source impedance of the condenser type microphone generator to a low impedance preamplifier circuit input. This is accomplished in the present invention with a preamplifier circuit employing a field effect transistor.

Other objects of the present invention will become apparent upon reading the following specification and referring to the accompanying drawings in which similar characters of reference represent corresponding parts in each of the several views.

The condenser microphone has achieved popularity recently because of its high performance characteristics. One advantage of the device is that there is nothing attached to the diaphragm to increase its mass and this is responsible for its high-frequency performance. However, in condenser microphones a constant polarizing charge must be maintained on the condenser so that the potential across the condenser can vary proportionately as the capacitance varies. Since one of the plates of the condenser is allowed to vibrate as sound waves strike it, the capacitance, and hence the potential, varies directly with the sound impinging on the condenser according to the equation:

(1) $$E = Q/C$$

where Q is the constant charge maintained on the condenser, C is the capacitance of the condenser, and E is the varying potential produced across the condenser.

(2) $$E \sim C$$

This signal can then be amplified and recorded or broadcast.

Figure 1:
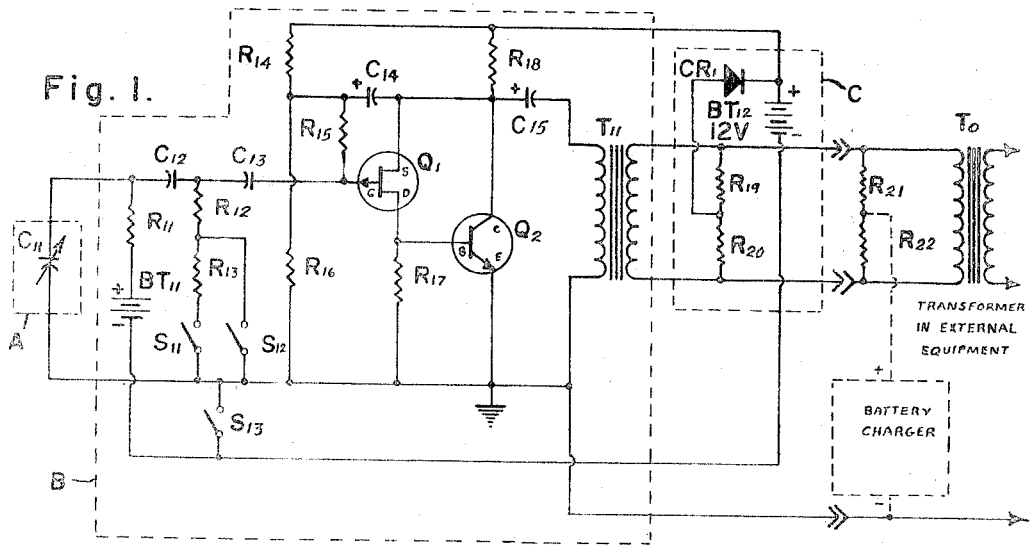
FIG. 1 is a diagram of a fundamental condenser microphone preamplifier circuit embodying the present invention.

It is seen that one major drawback of a condenser microphone is its requirement for a polarizing voltage supply which is an accessory which must somehow be accommodated. The present invention solves this problem by incorporating a solid electrolyte battery directly into the microphone circuit which is installed into the microphone head. Referring to FIG. 1, such a battery is shown as $BT_{11}$. The necessity for an external polarizing voltage supply is eliminated by the insertion of $BT_{11}$ directly into the circuitry located in the microphone head. Resistor $R_{11}$ serves as a load resistance in the polarizing circuit across which the desired signal voltage is generated and also serves as the D.C. bias voltage path for $C_{11}$. Capacitor $C_{12}$ allows only the variable component of the voltage across $C_{11}$ to be fed into the preamplifier circuit. This prevents the condenser polarizing voltage from adversely affecting the bias voltage of the first stage of the preamplifier circuit. Condenser $C_{11}$ represents the sound-sensitive condenser-tranducer.

Figure 2:
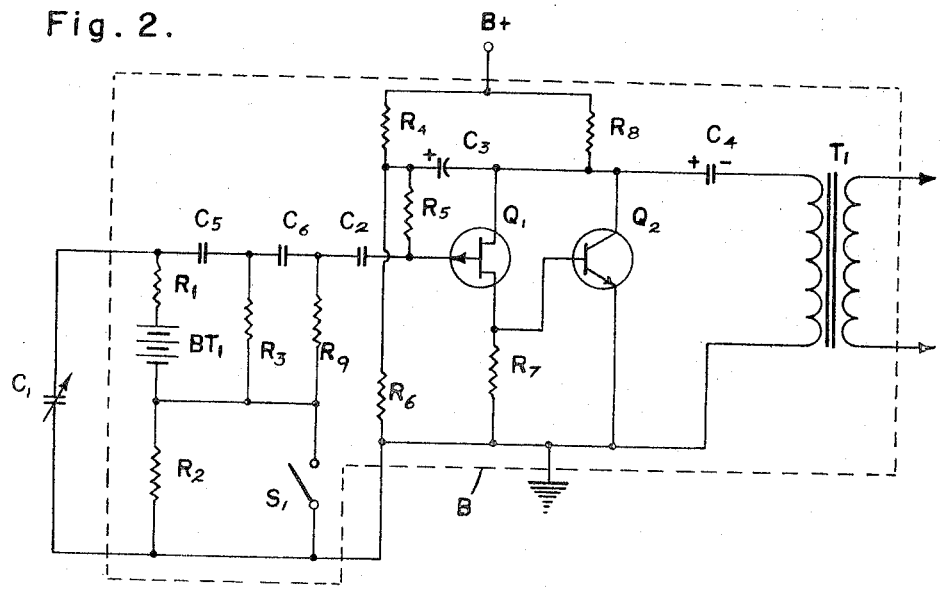
FIG. 2 is a diagram of a modified version of the condenser microphone preamplifier circuit embodying the present invention.

In the circuit of FIG. 2, the following components perform the same function as and correspond to the noted components described above with respect to FIG. 1: battery $BT_1$ corresponds to battery $BT_{11}$; resistor $R_1$ corresponds to resistor $R_{11}$; capacitor $C_2$ corresponds to capacitor $C_{12}$ and condenser-transducer $C_1$ corresponds to condenser-transducer $C_{11}$.

High quality music reproduction generally demands a lower frequency limit of 15–40 c.p.s. for the transmission channels and therefore also for the microphone. However, extension of the frequency range to the lowest frequencies must be won at the expense of great wind and mechanical shock sensitivity. To correct this situation, two approaches are utilized in the present invention. Referring to FIG. 2, $R_2$, $R_3$ and $R_9$ in combination with $C_5$ and $C_6$ form a high pass filter which, when the SPST switch $S_1$ is closed, cuts off frequency response to about —3 db at approximately 40 c.p.s., thereby effectively cutting off undesirable frequencies below this point when desired. When switch $S_1$ is open, the frequency response of the circuit remains flat to —3 db down to about 16 c.p.s. Referring to FIG. 1, $R_{12}$ and $R_{13}$ along with the magnetic reed switches $S_{11}$, $S_{12}$ form a low-frequency cut-off circuit similar in result to that described in FIG. 2. When $S_{11}$ is closed, both $R_{12}$ and $R_{13}$ are in series and frequency response is flat down to 40 c.p.s. When $S_{12}$ is closed, only $R_{12}$ is in the circuit and frequency response is flat down to 100 c.p.s. When $S_{11}$ and $S_{12}$ are open the frequency response is flat down to 10 c.p.s. This is accomplished because of the fact that when the input resistance of the circuit is made small, low frequency components of the signal are reduced through the internal drop of the condenser-transducer. Switch $S_1$ in FIG. 2 can be opened and switches $S_{11}$ and $S_{12}$ in FIG. 1 can be opened when low frequency cutoff is not desired, for instance when organ recordings flat to the lowest frequencies are to be made in an environment free from low frequency disturbances. Switch $S_{13}$ acts as a power off-on switch with both batteries $BT_{11}$ and $BT_{12}$.

In FIG. 1, resistors $R_{14}$, $R_{15}$ and $R_{16}$ function as a voltage divider to impress the proper bias voltage on the field-effect transistor $Q_1$. In FIG. 2, resistors $R_4$, $R_5$ and $R_6$ perform a similar function. In both FIG. 1 and FIG. 2, $Q_1$ represents a high-impedance P-channel field-effect transistor. In the past, high input impedances in audio amplifiers could only be obtained using standard vacuum tubes. The present invention utilizes a high-input-impedance field-effect transistor to permit a less complicated, smaller sized, and more reliable circuit. It should be pointed out that the source S of a field-effect transistor corresponds to the emitter of a bipolar transistor and to the cathode of a vacuum tube. Likewise, the gate G corresponds to a base or a grid and the drain D corresponds to a collector or a plate. The use of such a high-input-impedance field-effect transistor permits impedance matching with the condenser-transducer source eliminating the necessity of the conventional complicated and bulky impedance transforming circuits. In FIG. 1 resistor $R_{17}$ acts as a load resistance for the field-effect-transistor. In FIG. 2 resistor $R_7$ acts in a similar manner.

The effective input impedance of the circuit in FIG. 1 is further increased by the insertion of capacitor $C_{14}$, which produces a "bootstrapping" effect. This effect may increase the input impedance of the circuit by as much as ten times. Capacitor $C_3$ in FIG. 2 produces a similar result.

The conventional transistor second stage, utilizing NPN-type bipolar transistor $Q_2$, is used to increase the power output and lower the impedance for further amplification stages. In FIG. 1, resistor $R_{18}$ assists in the "bootstrapping" effect and also acts as a load resistance for transistor $Q_2$. Capacitor $C_{15}$ acts as a D.C. blocking capacitor to the preamplifier output. Transformer $T_{11}$ acts to couple the 50 ohm unbalanced output of the preamplifier to equipment with standard balanced input impedances. In FIG. 2, resistance $R_8$ corresponds to $R_{18}$, capacitor $C_4$ corresponds to $C_{15}$ and transformer $T_1$ corresponds to $T_{11}$.

In FIG. 1 the 12 volt nickel-cadmium battery $BT_{12}$ provides a B+ power supply for the circuit. This battery is incorporated into the microphone head itself, thereby eliminating the necessity for a separate D.C. power supply. The output of $T_{11}$ of FIG. 1 or $T_1$ of FIG. 2 along with a ground, therefore constitutes a three-wire system which can be utilized with standard three-wire cable and connectors and requires no adapters to connect to standard three-pin plugs of further amplification stages. It is also apparent that three-wire cable is considerably more flexible and easier to handle than larger cable previously used with condenser microphones. This is of considerable importance in designing microphone systems.

Referring to FIG. 1, resistors $R_{19}$ and $R_{20}$, together with diode $CR_1$ are within the microphone head and form a battery charging circuit for battery $BT_2$. This circuit, together with the external resistors $R_{21}$ and $R_{22}$, permit charging of battery $BT_2$ through standard three-wire cable and connectors while the microphone is in use. The battery charging circuit which is external to the microphone head is shown in broken lines. The output from $T_{11}$ is shown connected to transformer $T_0$, which is located in the next amplification stage, as it would be when charging $BT_2$ while the microphone is in operation. The four resistors $R_{19}$, $R_{20}$, $R_{21}$ and $R_{22}$ are all of the same value and function as a balanced bridge circuit. The charging current from the external battery charger divides exactly between $R_{21}$ and $R_{22}$. The voltage drop across $R_{21}$ and across $R_{22}$ is therefore exactly the same. Thus, no potential difference exists across the transformer coil of $T_{11}$ or $T_0$ and no D.C. charging current flows through these coils. D.C. current flow through the transformer coils is very undesirable as it increases distortion and degrades frequency response. Diode $CR_1$ prevents discharge of $BT_2$ in the event one side of either transformer $T_{11}$ or $T_0$ is shorted to ground accidentally. Thus, the above-described charging circuit permits charging of battery $BT_2$ from a remote location without the addition of leads for circuit energizing power transfer as is required in conventional condenser microphone systems.

Figure 3:
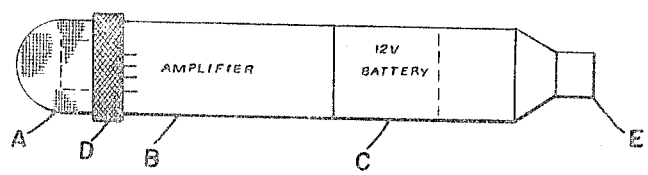
FIG. 3 is a reduced scale elevation view of a microphone head embodying the present invention, showing the relative mechanical placement and encapsulation of the major electrical components.

FIG. 3 shows the relative mechanical placement of the circuit elements described above in a microphone head approximately 8 inches in length and 1.2 inches in diameter. The condenser-transducer structure, identified as A, is placed at the upper or sound-sensitive extremity of the microphone and covered with a protective grid as shown at A in FIG. 3. The circuit elements making up the preamplifier are identified as B. The 12 volt battery C forms the remaining major mechanical element making up the microphone head structure. Each of the elements B and C is respectively encapsulated in individual compartments which can be combined to form the microphone structure. These elements can be made either to fit end to end and form the microphone alone or can be made to fit end to end within a protective shell or casing which forms the exterior of the microphone. It is evident that in either case, the major circuit elements can be removed and replaced with ease and with a minimum of lost time. This arrangement also greatly facilitates trouble shooting when one of the elements is not functioning properly. Switch $S_1$ or switches $S_{11}$, $S_{12}$, and $S_{13}$ can be incorporated into a rotatable ring D located at the upper end of the microphone head. The three-wire output cable is plugged into the three lead connector E located at the lower extremity of the microphone head. The total result is a compact and lightweight, yet rugged and efficient condenser microphone which is considerably superior to and different from existing condenser microphones.

The following is a chart showing representative values for the electrical components described above and shown in the circuit of FIG. 2.

| | |
|---|---|
| $R_{11}$ | 500 megohms. |
| $R_{12}$ | 20 megohms. |
| $R_{13}$ | 35 megohms. |
| $R_{14}$ | 1.2 megohms. |
| $R_{15}$ | 22 megohms. |
| $R_{16}$ | 2.2 megohms. |
| $R_{17}$ | 15 Kohms. |
| $R_{18}$ | 33 Kohms. |
| $R_{19}$, $R_{20}$, $R_{21}$, $R_{22}$ | 2 Kohms. |
| $C_{12}$, $C_{13}$ | 250 micromicrofarads. |
| $C_{14}$, $C_{15}$ | 15 microfarads. |
| $BT_{11}$ | 65 volt solid electrolyte battery. |
| $BT_{12}$ | 12 volt nickel-cadmium battery. |
| $CR_1$ | 1N5459 silicon diode. |
| $Q_1$ | 2N2607 field-effect transistor. |
| $Q_2$ | 2N3117 NPN silicon. |
| $S_{11}$, $S_{12}$, $S_{13}$ | Magnetic reed switch. |

Although the foregoing invention has been described in some detail, by way of illustration and example for purposes of clarity of understanding it is understood that certain changes and modifications may be practiced within the spirit of the invention and scope of the appended claims.

What is claimed is:

1. A condenser transducer system comprising,
a sound sensitive condenser transducer,
a direct current polarizing source comprising a solid electrolyte battery, imposing on said transducer a substantially constant polarizing charge whereby voltage across said transducer varies substantially in accordance with the variation in capacitance of said transducer,
a high input impedance solid-state device amplifying the signal of said transducer, said device comprising a high-input impedance field-effect transistor, and
preamplification means for further amplifying said signal, said means comprising a direct current battery, and a bipolar transistor.

2. A system according to claim 1 which further comprises recharging means to recharge said direct current battery through the output terminals of said system at the same time as said system is functioning as a microphone amplifier system.

3. A condenser transducer system comprising,
a sound sensitive condenser transducer,
a direct current polarizing source comprising a solid electrolyte battery imposing on said transducer a substantially constant polarizing charge, and in which said transducer and said solid electrolyte battery are contained within a microphone structure of cylindrical shape, lightweight and capable of being held in the hand, and amplifying means for amplifying the signal from said transducer, said amplifying means containing a high-input impedance field-effect transistor.

4. A condenser transducer system comprising,
a sound sensitive condenser transducer,
a direct current polarizing source having high internal resistance imposing on said transducer a substantially constant charge whereby voltage across said transducer varies substantially in accordance with the variation in capacitance of said transducer,
a high input impedance solid-state device amplifying the signal of said transducer, and
preamplification means for further amplifying said signal,
said preamplification means comprising a direct current battery, a bipolar transistor, an output transformer, and recharging means to recharge said direct current battery through the output terminals of said system at the same time as said system is functioning as a microphone amplifier system, said recharging means comprising two pairs of resistors, each resistor of equal value, said first pair of resistors in series with each other, the combination in parallel with the output coil of said output transformer, said second pair of resistors in series with each other, the combination in parallel with the input coil of the input transformer of an immediately succeeding external amplification stage, a lead from the common connection of said first pair of resistors to the positive side of said direct current battery, and a lead from the common connection of said second pair of resistors to the positive side of a battery charger power source to prevent direct charging current from flowing in either said output coil of said output transformer or said input coil of said input transformer of an immediately succeeding external amplification stage.

5. A condenser microphone comprising a structure of cylindrical shape, the length along the longitudinal axis being substantially greater than the diameter, lightweight and capable of being held in the hand, a condenser transducer, a polarizing power for said transducer, said power source comprising a solid electrolyte battery; a transistorized preamplification circuit for said transducer, an output transformer for said preamplification circuit and a direct current second battery for said circuit, said polarizing power source, transistorized preamplification circuit, output transformer and direct current second battery being contained within the physical dimensions of said microphone structure.

References Cited by the Examiner

UNITED STATES PATENTS

| | | | |
|---|---|---|---|
| 3,048,659 | 8/1962 | Crow et al. | 179—1. |
| 3,049,709 | 8/1962 | Rianhard et al. | |
| 3,125,646 | 3/1964 | Lewis | 179—107. |
| 3,207,848 | 9/1965 | Bore | 179—111. |
| 3,210,677 | 10/1965 | Lin et al. | 330—17. |
| 3,223,782 | 12/1965 | Weingartner | 179—111. |

OTHER REFERENCES

Electronic Design, "Additional Applications," October 1955, page 46.

Electronic Design, "Product Survey: Field-Effect Transistors," April 26, 1963, pp. 66–69.

KATHLEEN H. CLAFFY, *Primary Examiner.*

J. W. JOHNSON, H. ZELLER, *Assistant Examiners.*